(12) United States Patent
Martin et al.

(10) Patent No.: US 9,221,453 B2
(45) Date of Patent: Dec. 29, 2015

(54) DYNAMIC PEDAL RESPONSE FOR VEHICLE FUEL ECONOMY

(71) Applicant: FORD GLOBAL TECHNOLOGIES, LLC, Dearborn, MI (US)

(72) Inventors: Douglas Raymond Martin, Canton, MI (US); Jesse D. L. Brunais, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/178,378

(22) Filed: Feb. 12, 2014

(65) Prior Publication Data

US 2015/0224975 A1    Aug. 13, 2015

(51) Int. Cl.
*B60W 10/06* (2006.01)
*B60W 10/08* (2006.01)
*B60W 20/00* (2006.01)

(52) U.S. Cl.
CPC .............. *B60W 10/06* (2013.01); *B60W 10/08* (2013.01); *B60W 20/10* (2013.01); *Y10S 903/902* (2013.01)

(58) Field of Classification Search
CPC . B60W 2540/10; B60W 10/06; B60W 10/08; B60W 20/00; B60W 2710/0622; B60W 2710/0627; B60W 2710/0633; B60W 2540/106; B60K 6/445; F02D 2250/26; F02D 2200/602
USPC .......... 701/22, 51, 54, 123, 70; 477/110, 159; 180/65.265
See application file for complete search history.

(56) References Cited

U.S. PATENT DOCUMENTS

| | | | |
|---|---|---|---|
| 8,190,319 B2 | 5/2012 | Syed et al. | |
| 8,406,971 B2 | 3/2013 | Balton et al. | |
| 2003/0183431 A1* | 10/2003 | Cikanek et al. | 180/65.6 |
| 2009/0024292 A1 | 1/2009 | Kuwahara et al. | |
| 2012/0010792 A1* | 1/2012 | Nedorezov et al. | 701/54 |

* cited by examiner

*Primary Examiner* — Marthe Marc-Coleman
(74) *Attorney, Agent, or Firm* — David B. Kelley; Brooks Kushman P.C.

(57) ABSTRACT

A controller, in response to a change from a first steady pedal condition to a second steady pedal condition, decreases a torque command during the second steady pedal condition based on a difference between a peak torque command achieved during the change and a steady torque command corresponding to the first steady pedal condition. The controller also operates a powertrain to satisfy the torque command.

16 Claims, 3 Drawing Sheets

DYNAMIC PEDAL RESPONSE FOR VEHICLE FUEL ECONOMY

TECHNICAL FIELD

The present disclosure relates to controlling an electric machine and engine in a hybrid-electric vehicle.

BACKGROUND

Vehicles are commonly equipped with accelerator pedals. Upon actuation of the accelerator pedal in a vehicle equipped with an internal combustion engine, the engine throttle body permits greater intake air flow. As a result of the increased air flow, fuel flow is increased and the engine combustion rate is increased, resulting in an increased engine speed. In vehicles equipped with an internal combustion engine coupled with an electric machine or generator, actuation of the accelerator pedal may correspond with an overall system output power. Some driver's accelerator pedal actuation may over-shoot their target vehicle speed and in response to the over-shoot, the driver may actuate the accelerator pedal and under-shoot the target vehicle speed. This over-shoot followed by an under-shoot of target vehicle speed may negatively affect fuel economy.

SUMMARY

In at least one embodiment, a vehicle is provided. The vehicle may include a powertrain and at least one controller programmed to, in response to a change from a first steady pedal condition to a second steady pedal condition, decrease a value of a powertrain torque command during the second steady pedal condition based on a difference between a peak value of the torque command achieved during the change and a steady value of the torque command corresponding to the first steady pedal condition, and to operate the powertrain to satisfy the torque command.

In at least one embodiment, a powertrain controller is provided. The powertrain controller may include input communication channels configured to receive a pedal position signal and output communication channels configured to output a powertrain command. The controller may be provided with control logic configured to increase the powertrain command during a change from a first steady pedal condition to a second steady pedal condition and decrease the powertrain command from a peak value to a target value during the second steady pedal condition based on a decay function.

In at least one embodiment, a method of controlling a powertrain is provided. The method may include increasing a powertrain command during a change from a first steady pedal condition to a second steady pedal condition. The method may further include decreasing the powertrain command during the second steady pedal condition to a target value based on a difference between a peak powertrain command achieved during the change and a steady powertrain command corresponding to the first steady pedal condition. The method may further include operating the powertrain to satisfy the powertrain command.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art may understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
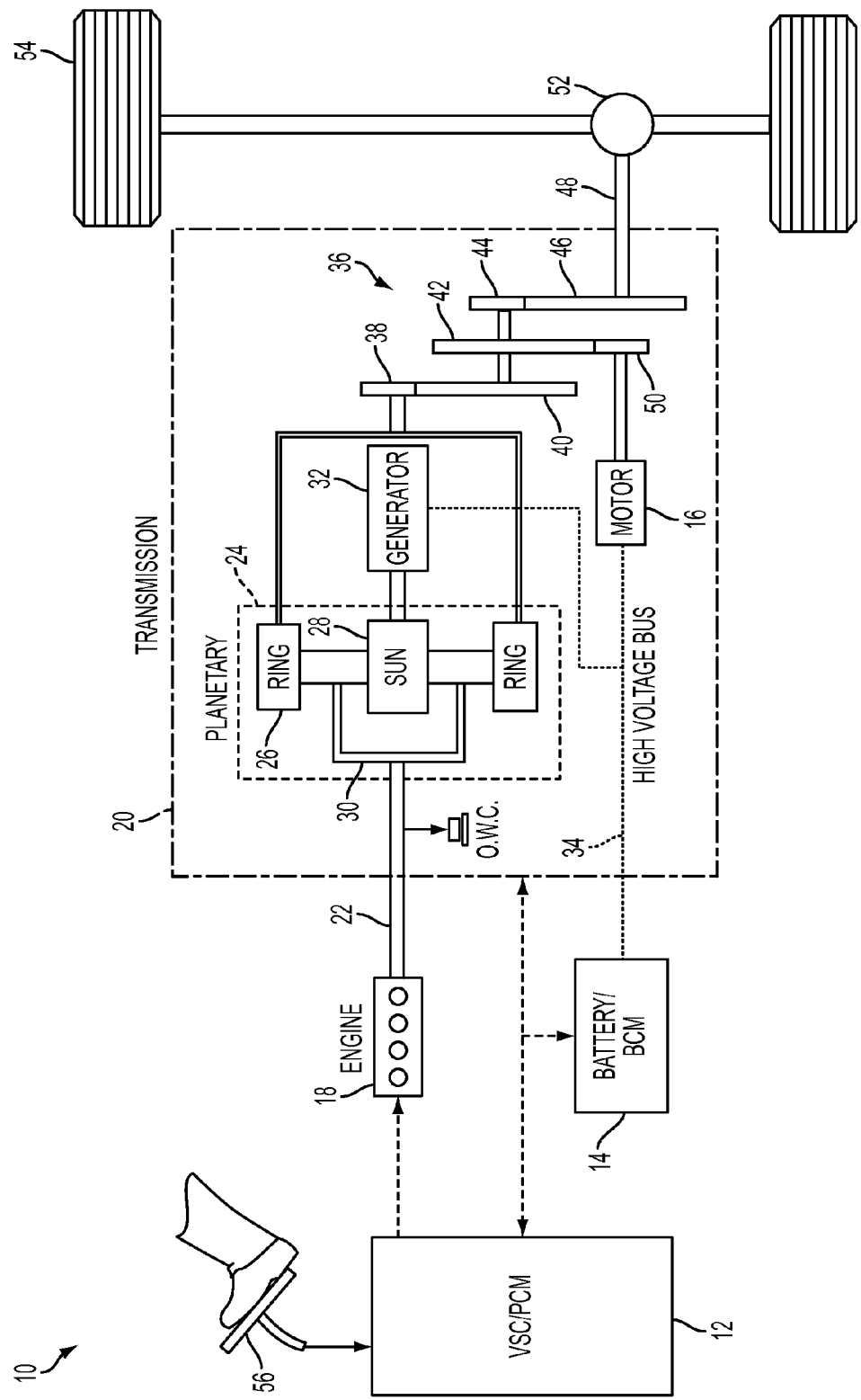
FIG. 1 is a schematic diagram of a vehicle powertrain.

Referring to FIG. 1, a hybrid electric vehicle (HEV) includes a power-split powertrain 10. A vehicle system controller (VSC) and/or powertrain control module (PCM) 12 control an electric traction battery 14. The battery 14 has a two-way electrical connection, whereby it receives and stores electric energy and also supplies the energy to an electric traction motor 16. The controller 12 also controls the operation of an internal combustion engine (ICE) 18. Both the motor 16 and the engine 18 are capable of powering a transmission 20 that ultimately delivers torque to the wheels of the vehicle.

The engine 18 delivers power to a torque input shaft 22 that may be connected to a planetary gear set 24 through a one way clutch. The input shaft 22 may be driveably connected to a planetary carrier assembly 30 that powers the planetary gear set 24 that may include ring gears 26, a sun gear 28. The sun gear 28 may be driveably connected to a generator 32. The generator 32 may be engaged with the sun gear 28, such that the generator 32 may either rotate with the sun gear 28, or not rotate with it. When the one way clutch (O.W.C.) couples the engine 18 to the planetary gear set 24, the generator 32 generates energy as a reactionary element to the operation of the planetary gear set 24. Electric energy generated from the generator 32 is transferred to the battery 14 through electrical connections 34. The battery 14 also receives and stores electric energy through regenerative braking, in a known fashion. The battery 14 may supply the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 34.

The vehicle may be powered by the engine 18 alone, by the battery 14 and motor 16 alone, or by a combination of the engine 18 with the battery 14 and traction motor 16. In a first mode of operation, the engine 18 may deliver torque through the planetary gear set 24. The ring gear 26 distributes torque to step ratio gears 36 comprising meshing gear elements 38, 40, 42, and 44. Gears 40, 42, and 44 are mounted on a countershaft, and gear 44 distributes torque to gear 46. Gear 46 then distributes torque to a torque output shaft 48. In the first mode of operation, the motor 16 may also be activated to assist in the engine 18. When the traction motor 16 is active in assisting, gear 50 distributes torque to gear 42 and to the countershaft.

In a second mode of operation, or EV mode, the engine 18 may be disabled or otherwise prevented from distributing torque to the torque output shaft 48. In the second mode of operation, the battery 14 powers the motor 16 to distribute torque through the step ratio gears 38 and to the torque output shaft 48. The torque output shaft 48 is connected to a differential and axle mechanism 52 which distributes torque to traction wheels 54. The controller 12 controls the battery 14, engine 18, motor 16 and generator 32 in order to distribute torque to the wheels 54 in either the first mode of operation or the second mode of operation.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

The controller 12 receives information from sensors (not shown) such that the controller 12 can monitor speeds of the motor 16, engine 18, generator 32 and wheels 54. Of course, one or more speeds may be determined, inferred, or calculated based on known relationships and/or ratios among the various components. In addition, corresponding torques of the motor 16, generator 32, ring gear 26, sun gear 28, carrier assembly 30, drive shaft 48 and wheels 54 may be calculated, measured, or otherwise determined.

While illustrated as one controller, the vehicle system controller 12 may be part of a larger control system and may be controlled by various other controllers throughout the vehicle. It should therefore be understood that the vehicle system controller 12 and one or more other controllers can collectively be referred to as a "controller" that controls various actuators in response to signals from various sensors to control functions such as starting/stopping the engine 18, operating the fraction motor 16 and generator 32 to provide wheel torque or charge the battery 14, select or schedule transmission shifts, etc.

The controller 12 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller may communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the vehicle system controller 12 may communicate signals to and/or from the traction motor 16, the engine 18, the planetary gear set 24, the step-ratio gears 36 and power electronics (not shown). Although not explicitly illustrated, those of ordinary skill in the art may recognize various functions or components that may be controlled by the controller 12 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures, and transmission, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), and deceleration or shift mode (MDE).

Control logic or functions performed by the vehicle system controller 12 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art may recognize that one or more of the illustrated steps or functions may be repeatedly performed depending upon the particular processing strategy being used. Similarly, the order of processing is not necessarily required to achieve the features and advantages described herein. Rather, the order is provided for ease of illustration and description.

The control logic may be implemented primarily in software executed by a microprocessor-based vehicle, engine, and/or powertrain controller, such as the vehicle system controller 12. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 56 may provide a powertrain command for output torque, power, or a drive command to propel the vehicle. In general, depressing or releasing the accelerator pedal 56 may generate an accelerator pedal position signal that may be interpreted by the controller 12 as a demand/request for increased torque/power or decreased torque/power from the powertrain 10, respectively. The accelerator pedal position may be varied from 0% (pedal fully released)

to 100% (pedal fully depressed). The controller 12 may be programmed to determine or calculate efficient engine operating points at a given engine speed and/or power/load level. Efficient engine operating points may be engine operating states at which brake specific fuel consumption (BSFC) is minimized at a given engine speed and/or power level. The controller 12 may be further programmed to operate the engine at or near efficient operating points.

Drivers, intending to achieve an increased vehicle speed may depress the accelerator pedal 56 beyond what is necessary to achieve the desired target vehicle speed and send the engine into a higher-power state. The accelerator pedal input may request more power or torque from the powertrain 10 than necessary and may result in an overshoot of the desired vehicle speed. Such overshoots of the desired vehicle speed may negatively impact vehicle fuel economy by operating the engine 18 at higher-power but lower efficiency states. A driver may attempt to correct for this vehicle speed overshoot by releasing the accelerator pedal 56, which may result in a demand for less power or torque, resulting in an under-shoot of the desired vehicle speed. The overshoot and subsequent under-shoot of the vehicle speed may result in engine speed transients, resulting in more time at less efficient engine operating points and negatively impacting fuel consumption.

The controller 12 may be further programmed to partly taper the torque or power response of the engine 18 or overall powertrain 10 when the accelerator pedal position is no longer changing to improve vehicle fuel economy and maintain an efficient engine operating point. The partly tapering of the torque or power response of the engine 18 may reduce the rate of vehicle speed increase reducing the likelihood of an overshoot and/or undershoot of the desired vehicle speed.

Figure 2A:
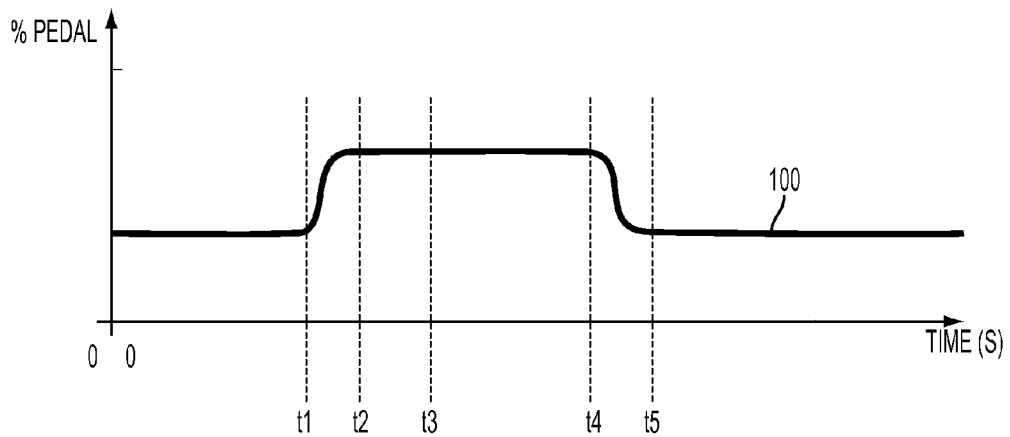
FIGS. 2A through 2C are time plots showing an exemplary system response to an accelerator pedal input.
Figure 2B:
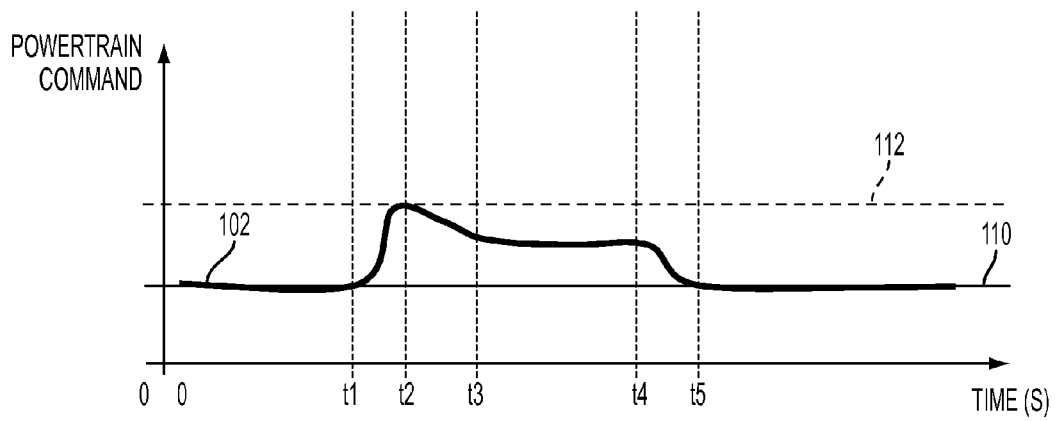
Figure 2C:
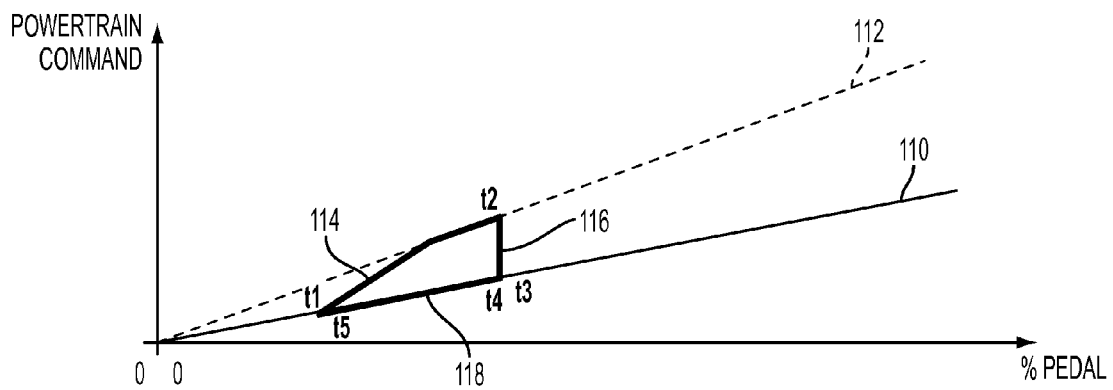

FIGS. 2A and 2B depict corresponding time plots of accelerator pedal input (% Pedal) and powertrain command, respectively. Each plot corresponds in time and demonstrates an exemplary embodiment of a dynamic accelerator pedal response for fuel economy. FIG. 2C demonstrates an exemplary relationship between powertrain command and accelerator pedal input.

FIG. 2A is a plot of a "digital driver" accelerator pedal input 100 over time. A "digital driver" accelerator pedal input may be indicated by a first steady accelerator pedal condition ending at t1 and a step increase to a higher pedal percentage ending at t2. This step increase to a higher pedal percentage may indicate an accelerator pedal tip-in. A second steady accelerator pedal condition may continue through t3 and end at t4. The "digital driver" accelerator pedal input may further be indicated by a step decrease to a lower pedal percentage ending at t5. This step decrease to a lower pedal percentage may indicate an accelerator pedal tip-out. A third steady accelerator pedal condition may occur after t5. This "digital driver" accelerator pedal input may result in an overshoot of a driver's desired target speed.

Changes in accelerator pedal position may be calculated or determined by a difference between an instantaneous or actual accelerator pedal position and a filtered accelerator pedal position. This filtered accelerator pedal position is a version of the actual accelerator pedal position subject to a time constant. A difference between the actual accelerator pedal position and the filtered accelerator pedal position greater than a threshold difference may represent a change in accelerator pedal position. Conversely, a difference between the actual accelerator pedal position and the filtered accelerator pedal position less than a threshold difference (e.g., less than 5%, etc.) may represent a steady accelerator pedal condition or a steady accelerator pedal position.

Continuing on to FIG. 2B, a plot of the corresponding powertrain command 102 in response to the dynamic pedal response for fuel economy control algorithm is depicted. The controller may be programmed to provide a steady state pedal map 110 and a peak pedal map 112. These pedal maps may be pre-programmed into the controller or calculated instantaneously by the controller based on various parameters. The pedal maps may be viewed as transfer functions between the input of an accelerator pedal position and the output of powertrain command. The controller may attempt to adjust or clip the powertrain command between the steady state pedal map 110 and the peak pedal map 112. This clipping may permit the engine and/or powertrain to operate at efficient operating points for longer periods of time which may lead to improved real world fuel economy.

Prior to t1, the corresponding powertrain command to the first steady pedal condition continues along the steady state pedal map 110, until the accelerator pedal position change is completed at t2. Based on the change in accelerator pedal position, indicating an accelerator pedal tip-in, the controller may calculate a transfer or conversion from the steady state pedal map 110 to the peak pedal map 112. This conversion may represent a powertrain command and may be based on the current powertrain command according to the steady state pedal map and the change in accelerator pedal position. The conversion may also be based on a tip-in slope when the change in accelerator pedal position indicates an accelerator pedal tip-in. Prior to t2, the powertrain command may increase and attempt to reach the peak pedal map 112. The accelerator pedal position may reach a steady condition prior to t3 and the controller may decay the powertrain command towards the steady state pedal map 110. This decay may be based on the current powertrain command, the distance the current powertrain command is from the steady state pedal map 110 and a decay factor. The decay factor may provide a constant or predetermined rate of decay of the powertrain command or a variable duration decay of the powertrain command towards a target powertrain command value.

Beginning at t4, a change in accelerator pedal position, indicating an accelerator pedal tip-out, may occur and end at t5. The accelerator pedal tip-out may result in the powertrain command decaying towards and eventually reaching the steady state pedal map 110.

Continuing on to FIG. 2C, the powertrain command is depicted as operating between and on the steady state pedal map 110 and the peak pedal map 112 based on the accelerator pedal position. The correlations between accelerator pedal position and powertrain command are depicted as linear relationships for the dynamic pedal response for fuel economy. Other relationships between accelerator pedal position and powertrain command are contemplated, such as an exponential, logarithmic, polynomial etc.

As the change in accelerator pedal position indicates an accelerator pedal tip-in greater than a threshold, the conversion 114 is calculated. The conversion 114 has a tip-in slope to transfer from the steady state pedal map 110 to the peak pedal map 112. As the accelerator pedal position reaches a steady condition, the decay 116 uses a decay function or factor to decay the powertrain command towards the steady state pedal map 110. If the change in accelerator pedal position indicates an accelerator pedal tip-out, the powertrain command may continue to decay along decay 118. Throughout the "digital driver" accelerator pedal input, the dynamic pedal response for fuel economy algorithm may clip the powertrain command between or on the steady state pedal map 110 and the peak pedal map 112, as depicted in FIG. 2C. This clipping of the powertrain command may enable the engine to operate closer to steady state operating points, which may lead to better fuel economy.

Figure 3:
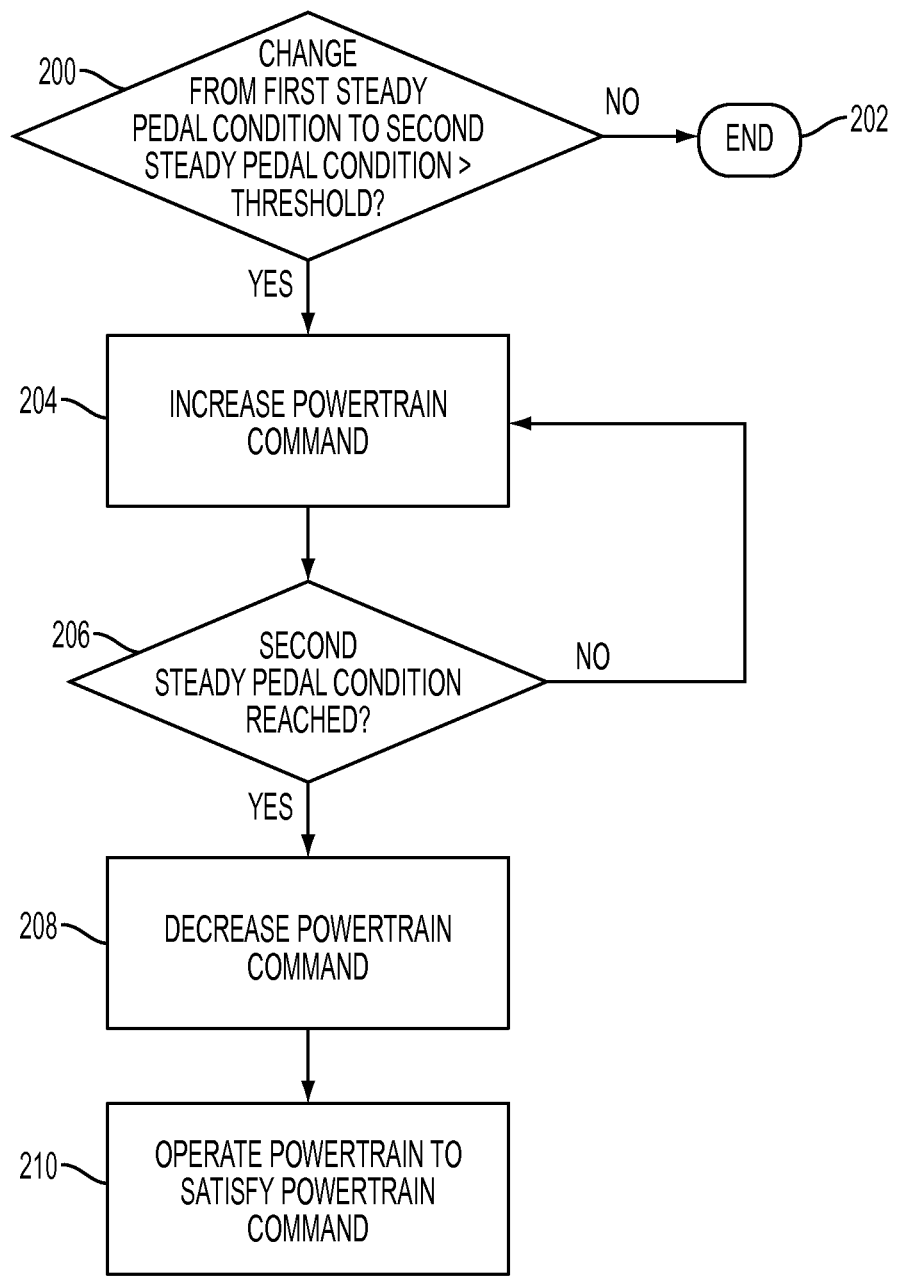
FIG. 3 is a flowchart of an exemplary method of controlling a powertrain.

Referring to FIG. 3, a flowchart of an exemplary method of controlling a powertrain is shown. The illustrated functions may be modified, or in some cases omitted, without departing from the scope intended.

At block 200, the controller 12 may determine if there has been a change from a first steady accelerator pedal condition to a second steady accelerator pedal condition. For example, if there has not been a change from a first steady accelerator pedal condition to a second steady accelerator pedal condition or a change in accelerator pedal position less than a threshold, the method may end at block 202. At block 202, the controller 12 may not employ the dynamic pedal response for fuel economy and may apply the steady state pedal map to control the powertrain. If the change from a first steady accelerator pedal condition to a second steady accelerator pedal condition is greater than a threshold, then the method may continue to block 204.

At block 204, the controller 12 may apply the dynamic pedal response for fuel economy in response to the change from the first steady accelerator pedal condition to the second steady accelerator pedal condition. The controller 12 may increase a powertrain command during the change. To increase the powertrain command, the controller 12 may calculate the powertrain command based on the current powertrain command based on a steady state pedal map and the change from the first steady pedal condition to the second steady pedal condition and the minimum of a calculated tip-in slope or peak slope. The increase in powertrain command may transfer control of the powertrain from the steady state pedal map to the peak pedal map. The method may then determine if a second steady accelerator pedal condition is reached at block 206.

If a second steady accelerator pedal condition is reached, the method may continue to block 208. At block 208, the controller 12 may decrease the powertrain command during the second steady accelerator pedal condition. To decrease the powertrain command, the controller 12 may calculate the powertrain command based on the current powertrain command and a delta of the current powertrain command from the steady state pedal map and a decay factor. The delta is the difference from current powertrain command operating point to a corresponding powertrain command operating point on the steady state pedal map. The decrease may occur at a constant rate with a variable duration that may provide a powertrain command such that the rate of vehicle speed increase is decreased to reduce the possibility of an overshoot of the desired vehicle speed. At block 210, the controller 12 may operate the powertrain to satisfy the powertrain command and may continue to clip or adjust the powertrain command between the steady state pedal map and the peak pedal map.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a powertrain; and
   a controller programmed to, in response to a change between first and second steady pedal conditions,
   decrease a value of a powertrain torque command during the second steady pedal condition based on a difference between a peak value of the torque command during the change and a steady value of the torque command corresponding to the first steady pedal condition, and
   operate the powertrain to satisfy the torque command.

2. The vehicle of claim 1 wherein the controller is further programmed to decrease the value of the torque command to a target value based on the difference.

3. The vehicle of claim 1 wherein values of the torque command during the second steady pedal condition are greater than the steady value of the torque command corresponding to the first steady pedal condition.

4. The vehicle of claim 1 wherein a duration of the decrease is predetermined.

5. The vehicle of claim 1 wherein the controller is further programmed to, during the change, increase a value of the torque command based on the steady value of the torque command corresponding to the first steady pedal condition.

6. The vehicle of claim 1 wherein the controller is further programmed to decrease the value of the torque command based on a current value of the torque command and a decay factor.

7. A powertrain controller comprising:
   input communication channels configured to receive a pedal position signal;
   output communication channels configured to output a powertrain command; and
   control logic configured to
   increase the powertrain command during a change from a first steady pedal condition to a second steady pedal condition; and
   decrease the powertrain command from a peak value to a target value during the second steady pedal condition based on a decay function.

8. The powertrain controller of claim 7 wherein values of the powertrain command during the second steady pedal condition are greater than a steady value of the powertrain command during the first steady pedal condition.

9. The powertrain controller of claim 8 wherein the decay function is based on a difference between the peak value and the steady value.

10. The powertrain controller of claim 7 wherein a rate of the increase is based on a steady value of the powertrain command during the first steady pedal condition.

11. The powertrain controller of claim 10 wherein a rate of the decrease is based on a current value of the powertrain command and a difference between the current value and the steady value.

12. The powertrain controller of claim 7 wherein a duration of the decrease is based on the decay function.

13. The powertrain controller of claim 12 wherein the duration is less than a duration of the second steady pedal condition.

14. A method of controlling a powertrain comprising:
   increasing a powertrain command during a change from a first steady pedal condition to a second steady pedal condition;
   decreasing the powertrain command during the second steady pedal condition to a target value based on a difference between a peak powertrain command achieved during the change and a steady powertrain command corresponding to the first steady pedal condition; and
   operating the powertrain to satisfy the powertrain command.

15. The method of claim 14 wherein a rate of the decreasing is predetermined.

16. The method of claim 14 wherein a rate of the decreasing is based on a current value of the powertrain command and a decay factor.

* * * * *